(No Model.)

S. ELLIOTT.
SUPPORT FOR VELOCIPEDES.

No. 491,475. Patented Feb. 7, 1893.

WITNESSES
Irving H. Fay.
Larry H. Gravels.

INVENTOR
Sterling Elliott
by B. J. Noyes,
ATTY

UNITED STATES PATENT OFFICE.

STERLING ELLIOTT, OF NEWTON, ASSIGNOR TO THE HICKORY WHEEL COMPANY, OF WATERTOWN, MASSACHUSETTS.

SUPPORT FOR VELOCIPEDES.

SPECIFICATION forming part of Letters Patent No. 491,475, dated February 7, 1893.

Application filed March 19, 1892. Serial No. 425,541. (No model.)

*To all whom it may concern:*

Be it known that I, STERLING ELLIOTT, of Newton, county of Middlesex, State of Massachusetts, have invented an Improvement in Supports for Velocipedes, of which the following description, in connection with the accompanying drawings, is a specification, like letters on the drawings representing like parts.

This invention has for its object to construct a cheap, yet serviceable and sightly support for bicycles, whereby they may be held in upright position, for exhibition, and other purposes.

In accordance with this invention a short post rises from a base, which may be secured to the floor, or it may be weighted, and a suitably constructed clamp is arranged on said post, which is adapted to engage one of the pedals of the machine. This clamp is made vertically adjustable on the post, and the jaws or parts of said clamp are also adjustable, one with relation to the other.

As herein represented I have provided each clamping jaw with a hole of suitable size and shape to receive the projections which are formed on the outer end of the pedal, and as all pedals of common form now upon the market are provided with such projections, which it will be understood are used to prevent the foot from slipping off, a clamp, the jaws of which are constructed as aforesaid, may be employed to engage the pedals of the different classes or makes of machines.

Figure 1:
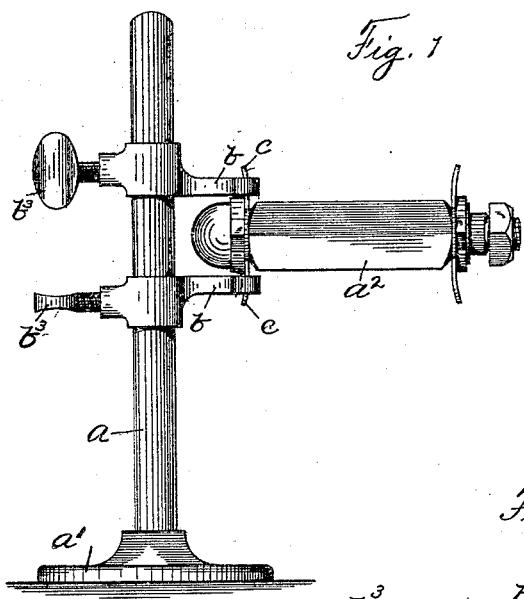
Figure 2:
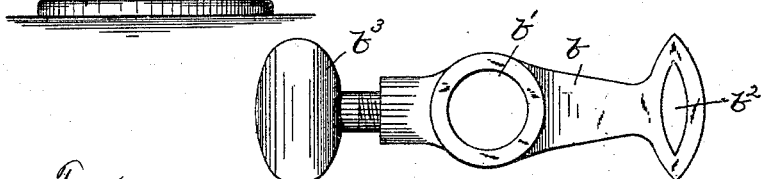

Figure 1, shows in front elevation, a support for bicycles embodying this invention. Fig. 2, a plan view of one of the clamping jaws, and Fig. 3, a modification, showing a weighted base in contradistinction to one which is secured to the floor.

Figure 3:
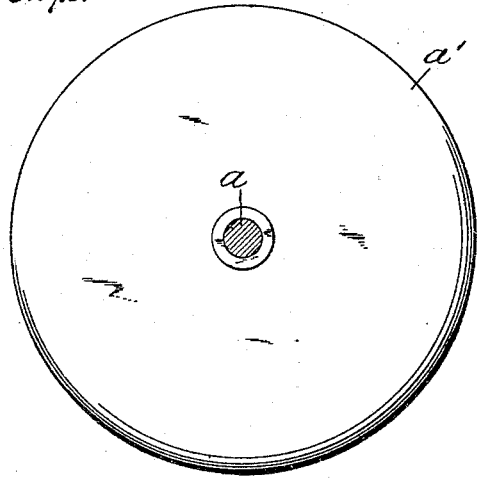

The post $a$, rises from a base $a'$, which may be constructed so as to be screwed to a floor as represented in Fig. 1, or made very large, as represented in Fig. 3, to thereby support the parts by its own weight. The clamp which is arranged on said post, as herein shown, consists of two clamping jaws similarly constructed, each comprising an arm $b$, having a hole $b'$, at one end, suitably shaped to receive the post $a$, thereby enabling it to be moved up and down on said post, and having at its other end an elliptical, oblong, or other shaped hole $b^2$, adapted to receive the projection, such as $c$, on the pedal $a^2$, of the bicycle.

These arms $b$, $b$, are each provided with a set screw $b^3$, or suitable clamping device, by means of which they may be held in fixed position upon the post $a$, at any desired point, and also at any desired distance apart. As upon the ordinary bicycle pedal there are two such projections $c$, one upon each side, the said clamping jaws $b$, $b$, are brought into position to engage both projections, and then by being firmly secured to the post, it will be seen that the bicycle will be supported in an upright position. I may employ but one of said clamping jaws for light weight machines, although I prefer to employ two jaws. In lieu of this particular construction of clamp, I may employ any other suitable form of pedal engaging clamp, which is held by a suitable fixed support, yet preferably made vertically adjustable on said support.

I claim—

1. A support for bicycles consisting of a post, and a pedal engaging clamp thereon, the clamping jaws of which are adjustable one with relation to the other, substantially as described.

2. A support for bicycles consisting of a post, and pedal engaging clamp comprising the arm $b$, on the post, having a hole to receive the projection $c$, of the pedal, substantially as described.

3. A support for bicycles consisting of a post, and a pedal engaging clamp thereon, two arms $b$, $b$, each having at its outer end a hole to receive the projections $c$, $c$, of the pedal, substantially as described.

4. A support for bicycles consisting of a post, and pedal engaging clamp comprising the arm $b$, vertically adjustable on said post, and having a hole to receive a projection on the pedal, substantially as described.

In testimony whereof I have signed my name to this specification in the presence of two subscribing witnesses.

STERLING ELLIOTT.

Witnesses:
 BERNICE J. NOYES,
 LUCY F. GRAVES.